May 19, 1970 M. VITALONI ET AL 3,512,746
ADJUSTABLE SIDE REAR VIEW MIRROR FOR MOTOR VEHICLES
Original Filed Aug. 2, 1965 2 Sheets-Sheet 1
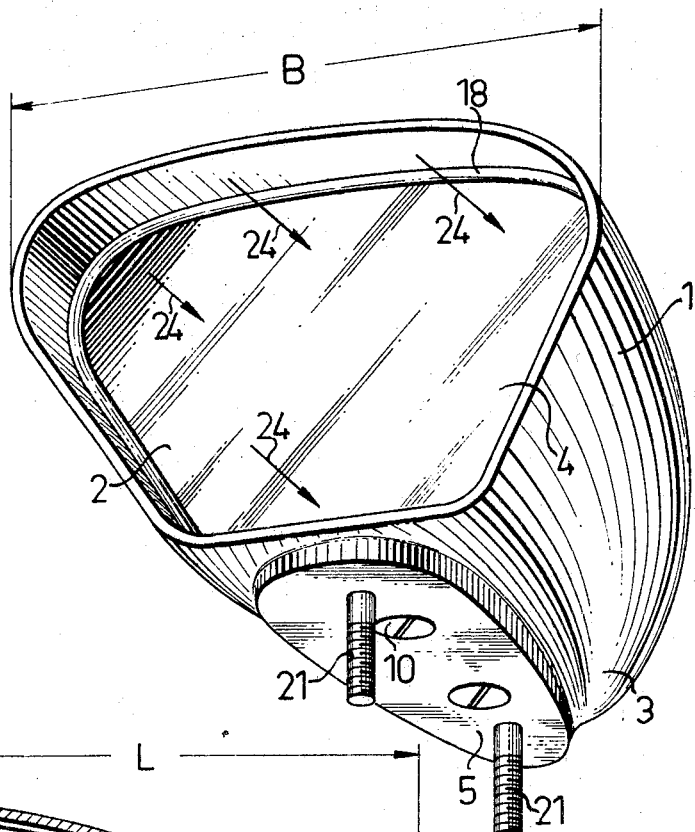
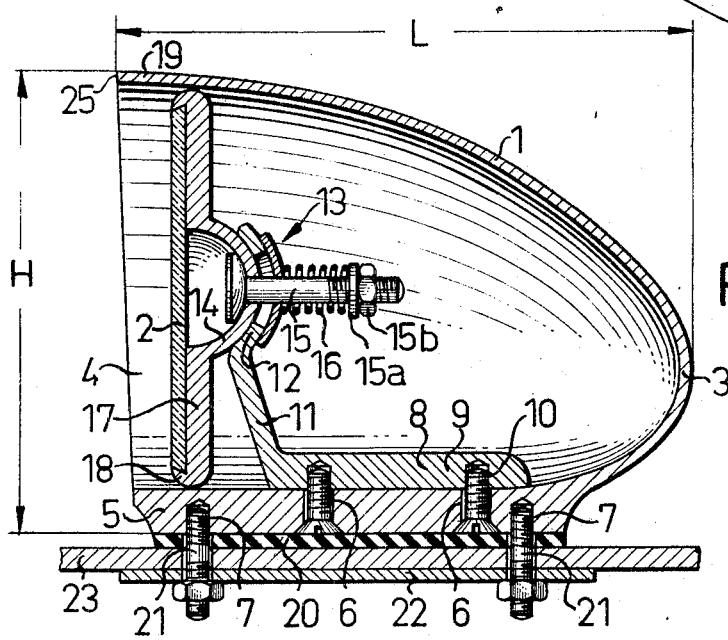
INVENTORS:
Mario Vitaloni
Giovanni Vitaloni
BY
Walter Becky INVENTORS:
Mario Vitaloni
Giovanni Vitaloni

United States Patent Office 3,512,746
Patented May 19, 1970

---

3,512,746
ADJUSTABLE SIDE REAR VIEW MIRROR FOR MOTOR VEHICLES
Mario Vitaloni and Giovanni Vitaloni, both of 12 Via Tepice, Turin, Italy
Continuation of application Ser. No. 476,495, Aug. 2, 1965. This application Apr. 15, 1968, Ser. No. 726,640
Int. Cl. B60r 1/06
U.S. Cl. 248—483                                3 Claims

ABSTRACT OF THE DISCLOSURE

A side rear view mirror for motor vehicles having a stream-lined housing increasing in cross-section from its closed front end toward its open rear end, and having a bottom wall with bores therein for receiving connecting screws to be screwed into a portion of a motor vehicle body for connecting said bottom wall and thereby said housing to said motor vehicle. Completely arranged in said housing is a holding member with a first arm supported by, and firmly connected to the wall, and with a second arm extending upwardly from said first arm and having a socket section adjustably and arrestably supporting a cup portion of the mirror means.

---

The present invention relates to an adjustable side rear view mirror for motor vehicles and is a continuation application of our copending application Ser. No. 476,495 filed Aug. 2, 1965 and now abandoned.

With heretofore known mirrors of the type involved, the mirror is fixedly mounted in housing means therefore, and for purposes of adjusting the mirror, it is necessary to adjust the mirror housing or the like, relative to the vehicle. One of the drawbacks of this type of rear view mirror consists in that each time the housing is accidentally moved by a person passing by said mirror, for instance in narrow garages or parking places, the mirror will be displaced relative to its previous adjustment. Furthermore, such mirror housing frequently is of considerable weight and thus may adjust itself in response to considerable vibrations or shocks.

It is, therefore, an object of the present invention to provide a side rear view mirror for motor vehicles, which will overcome the above-mentioned drawbacks.

It is another object of this invention to provide a side rear view mirror for motor vehicles in which the mirror will remain in its respective adjusted position even when the housing for the mirror is subjected to a considerable shock or blow.

It is still another object of this invention to provide a side rear view mirror for motor vehicles, which will have a smooth outer appearance.

Still another object of this invention consists in the provision of a side rear view mirror of the above-mentioned type which can easily be mounted on and removed from a motor vehicle.

These and other objects and advantages of the invention will appear more clearly from the following specification in connection with the accompanying drawings, in which:

FIG. 1 is a perspective view of a side rear view mirror according to the present invention, for motor vehicles;

FIG. 2 is a longitudinal section through the side rear view mirror of FIG. 1 while being mounted on a motor vehicle;

Figure 3:
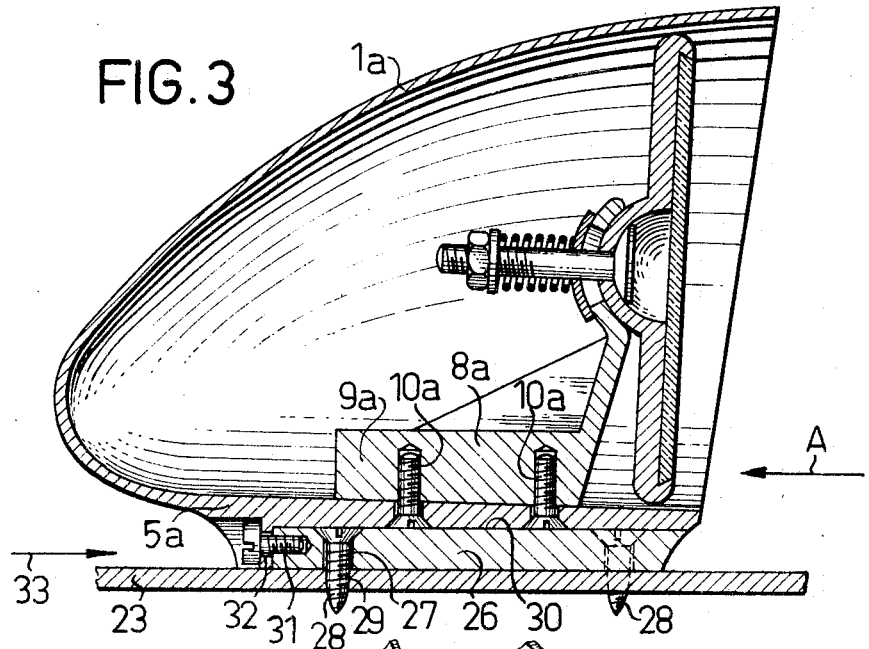
FIG. 3 illustrates a modified side rear view mirror arrangement according to the present invention.

A side rear view mirror according to the present invention is characterized primarily in that the mirror proper is spaced from the marginal area of the housing, which latter is fixedly connected to the vehicle body. The said mirror is adjustable within the housing. In this connection, it is advantageous to so arrange the mirror within the housing that the edge of the mirror body or the fitting therefor is close to the inner surface of the housing, so that the mirror or the fitting therefor can at least at certain areas engage the adjacent housing surface.

Since in this way the housing is fixedly and rigidly connected to the vehicle body, accidental mirror adjustments by accidental contact with or blow on the housing, will be impossible. Moreover, since the mass of the mirror body is small, a firm but manually adjustable mounting of the mirror body will be possible. On the other hand, by a correspondingly aimed pressure by a finger upon the mirror body, the latter can easily be adjusted to the desired extent.

According to a further development of the present invention, the side rear view mirror is furthermore characterized in that the housing encasing the mirror proper is detachably connected with an intermediate plate adapted to be connected to the vehicle, said intermediate plate being provided with means engaging the wall of the vehicle. These means are preferably in the form of screws which are adapted to be screwed into bores in the wall of the vehicle to thereby establish a fixed and firm connection between the vehicle and said intermediate plate.

Referring now to the drawings in detail, and FIGS. 1 and 2 thereof in particular, the side rear view mirror illustrated therein substantially comprises a metallic housing 1 having an adjustably journalled mirror body 2 arranged therein.

As will be seen from the drawing, housing 1 is somewhat funnel or tear-shaped and has a dome-like rounding 3 which in assembled position of the mirror will face forwardly with regard to the forward driving direction of the vehicle. Preferably, the length L of the housing is somewhat greater than the width B and height H within the range of its opening 4. Housing 1 furthermore has a plate-shaped foot 5 with bores 6 and threaded bores 7.

Within housing 1 there is arranged an angle-shaped holder 8 which has one leg 9 connected to the inner surface of foot 5 by means of screws 10. The other leg 11 is inclined toward the housing opening 4 and has a socket 12 at its free end which socket forms a part of a ball joint 13 with a spherical cup 14. The mirror arrangement furthermore comprises a stud or pin 15 fastened to cup 14 in any convenient manner, for instance by soldering, and pressure spring means 16 having one end resting against a spherical spring dish 16a on the outside of socket 12, while the other end of said spring means rests against a washer 15a adjacent a nut 15b on stud 15. It will be appreciated that due to spring 16, the spherical cup 14 is continuously held and urged against socket 12 by means of said spring 16.

As will furthermore be seen from the drawing, the spherical cup 14 preferably represents an integral part of a holding means or fitting 17 for the mirror body 2. Said fitting 17 additionally forms a frame 18 embracing the edge or margin of mirror body 2. Frame 18 has its outer circumference in contact with the inner surface of housing 1 in normal position of the mirror body 2, as illustrated in FIG. 2. If desired, frame 18 may be elastically deformable and may sealingly engage the housing 1. The marginal portions 19 which define the opening 4 of the housing are smooth and practically parallel to each other while extending at a substantially right angle with regard to the plane of the mirror body 2. Housing 1 is, through the intervention of an intermediate sealing gasket 20 and by means of threaded bolts 21 and a pressure plate 22, fixedly connected to a wall portion 23 of the vehicle body.

It will thus be seen that housing 1 is merely within the range of its foot portion 5 provided with perforations which, however, are sealed by sealing plate 20. All other wall portions of the housing are smooth and uninterrupted.

The adjustment of mirror body 2 is effected by a pressure of one or more fingers in the direction of the arrows 24. It will be appreciated that during this adjustment, the position and location of housing 1 remain unchanged. There is effected solely an adjustment of the mirror body 2 with holding device 17 relative to the housing 1. An accidental adjustment of the mirror body 2 is avoided and made practically impossible becaue the mirror body is well protected inside the housing 1 and spaced from the edges 25 of the marginal portion of the housing 19. If it should happen that, accidentally, the spring pressure in ball joint 13 should be reduced, it will be appreciated that an additional assurance form firmly holding the mirror body 2 in its desired position consists in that frame 18 will, following an adjustment of the mirror body 2, still partly contact housing 1. Advantageously, also frame 18 and the fitting 17 forming said frame 18 will consist of an at least slightly elastic synthetic material as, for instance, polyamide or polyvinylchloride.

Figure 4:
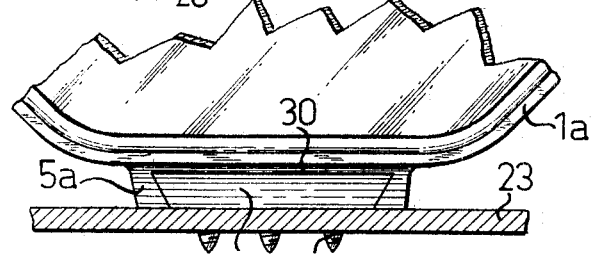
FIG. 4 illustrates the lower portion of FIG. 3 as seen in the direction of the arrow A.
Figure 5:
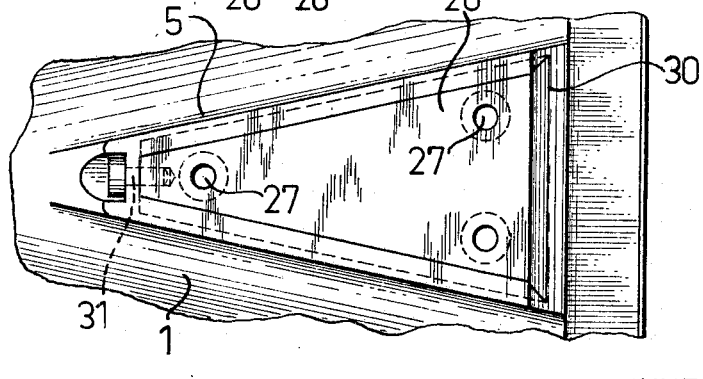
FIG. 5 illustrates a bottom view of the mirror of FIG. 3 with an intermediate plate thereon.

Referring now to the embodiment illustrated in FIGS. 3 to 5, the side view mirror illustrated therein corresponds in part to that of FIG. 1, and corresponding members have, therefore, been indicated with the same numeral as in FIG. 1 but with the additional character *a*. More specifically, the mirorr shown in FIG. 3 likewise comprises a housing 1a which encases the mirror body. The mirror structure is shown to be of the the same type as that shown in FIG. 2 and by means of a cup-and-socket arrangement is supported by a holder 8a similar to the holder 8 of FIG. 2. The substantially horizontal leg 9a of the holder 8 rests on the inner surface of housing 1. Said leg 9a is connected by screws 10a to the foot 5a of housing 1.

For purposes of connecting housing 1a to the wall portion 23 of the vehicle, there is provided an intermediate plate 26 which is wedge-shaped in plan view (FIG. 5) and has three bores 27 adapted to permit the passage of screws 28 which are adapted from the outside to be screwed into corresponding bores 29 of the vehicle wall portion 23.

Intermediate plate 26 is laterally undercut and is arranged in a correspondingly wedge-shaped recess 30 in the foot portion 5, as is clearly shown in FIG. 5. The interengaging under cut areas of said intermediate plate 26 and foot portion 5 are dove-tailed in cross-section (FIG. 4) and the thus-formed interengagement represents a positive connection between intermediate plate 26 and housing 1a. In order to prevent an accidental relative displacement between the intermediate plate 26 and housing 1, foot 5 carries a screw 31 which extends through a bore 32 of foot 5 and threadedly engages a corresponding bore in the intermediate plate 26, said bore extending in longitudinal direction of said plate 26. It will be appreciated that screw 31 engages intermediate plate 26 at the tip portion thereof and thus assures a firm but detachable connection between housing 1 and intermediate plate 26.

When the mirror is to be installed, first intermediate plate 26 is firmly connected with the vehicle by screws 28 engaging bores 29 in the wall portion 23 of the vehicle. Thereupon, the mirror is in the direction of the arrow 33 (FIG. 3) slipped over the intermediate plate 26. When a firm engagement has been effected between the interengaging dovetailed portions of intermediate plate 26 and housing 1a, screw 31 is introduced and tightened, thereby even more firmly connecting housing 1a with intermediate plate 26. Screws 28 are preferably of the type having a coarse thread and customarily used in connection with the car body.

What we claim is:

1. A side rear view mirror for motor vehicles, which includes: a streamlined housing having a closed front end and being open at its rear end only while increasing in cross-section rearwardly, said housing also having a platform bottom portion forming an integral entity with said housing and extending to said open rear end, said bottom portion having a substantially plane inner surface and being considerably thicker than the rest of the walls of said housing and being provided with bores therethrough substantially perpendicular to the said inner plane surface of said bottom portion, a mirror support having two arms arranged at an obtuse angle with regard to each other, one of said arms including a socket section for adjustably receiving a complementary cup portion of a mirror structure interiorly reactionless, and the other arm of said mirror support engaging and resting upon said plane inner surface, and screw means countersunk in said bottom portion and extending therethrough and into that leg of said mirror support which rests on said plane inner surface, said bottom portion comprising threaded blind bores substantially parallel to said first-mentioned holes and open at that side of said bottom portion which is opposite said plane inner surface for receiving sealingly connecting screws for connecting said rear view mirror vibrationless externally to a motor vehicle directly.

2. A mirror according to claim 1, which includes a holding member comprising a cup journalled in said socket section and supporting a mirror body, said holding member assuring against vibration displacement by being so dimensioned that its rounded dome periphery only partially engages and adjoins the interior of said housing.

3. A rear view mirror for motor vehicles, which includes: a stream-lined housing having a closed front end and being open at its rear end only, said housing increasing in cross-section from its closed front end toward its open rear end only for receiving a mirror therein, said housing having a platform bottom comprising a first wall with screws extending therethrough into the interior of the housing for connecting a mirror holder in the interior of said housing to said first wall, said first wall being integral with said housing so as to form a single entirety therewith, said first wall having its bottom side provided with a wedge-shaped dovetailed recess, said bottom also comprising a second wall arranged on the outside of said first wall and having a wedge-shaped dovetailed contour complementary fitting into said recess for selective insertion thereinto and withdrawal therefrom, said second wall having bores therethrough, screw means extending through said second wall and protruding from the bottom side of said second wall and adapted to be screwed into a car body, said screw means having heads which is assembled condition of said second wall are completely encased between said first and second walls, and additional screw means having a head encased in said first wall and having a threaded portion in engagement with said second wall for wind enhanced wedging detachably connecting said first and second walls to each other.

References Cited

UNITED STATES PATENTS

| | | | |
|---|---|---|---|
| 2,629,286 | 2/1953 | Budreck | 248—484 X |
| 2,775,919 | 1/1957 | Fischer | 248—479 |
| 2,893,676 | 7/1959 | Connors et al. | 248—225 |
| 3,077,142 | 2/1963 | Jacobson | 74—501 |

FOREIGN PATENTS

| | | |
|---|---|---|
| 915,538 | 7/1954 | Germany. |
| 855,251 | 11/1960 | Great Britain. |
| 908,369 | 10/1962 | Great Britain. |
| 617,645 | 2/1961 | Italy. |

ROY D. FRAZIER, Primary Examiner

F. DOMOTOR, Assistant Examiner

U.S. Cl. C.R.

248—225